(12) United States Patent
Fenney et al.

(10) Patent No.: US 6,313,846 B1
(45) Date of Patent: Nov. 6, 2001

(54) TEXTURING AND SHADING OF 3-D IMAGES

(75) Inventors: Simon James Fenney, Street Village; Mark Edward Dunn, Watford; Ian James Overliese, London; Peter David Leaback, Radlett; Hossein Yassaie, Chesham, all of (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 09/050,564

(22) Filed: Mar. 30, 1998

Related U.S. Application Data (62) Division of application No. 08/928,955, filed on Sep. 12, 1997, which is a division of application No. 08/593,649, filed on Jan. 29, 1996, now abandoned.

(30) Foreign Application Priority Data

Jan. 31, 1995 (GB) .................................................. 9501832

(51) Int. Cl.$^7$ ...................................................... G09G 5/00
(52) U.S. Cl. ............................................................ 345/552
(58) Field of Search ................................... 345/430, 426, 345/425, 552

(56) References Cited

U.S. PATENT DOCUMENTS

| 5,490,240 | 2/1996 | Foran et al. . | |
| 5,495,563 | 2/1996 | Winser | 345/430 |
| 5,544,292 | 8/1996 | Winser | 345/430 |
| 5,745,118 | 4/1998 | Alcorn et al. | 345/430 |
| 6,016,151 | 1/2000 | Lin | 345/430 |

FOREIGN PATENT DOCUMENTS

| 0 256 455 | 2/1988 | (EP) . |
| 0 438 194 A3 | 7/1991 | (EP) . |
| 0 438 195 A2 | 7/1991 | (EP) . |
| 0 447 227 A2 | 9/1991 | (EP) . |
| 0 447 227 A3 | 9/1991 | (EP) . |
| 0 637 814 A2 | 2/1995 | (EP) . |
| 2 240 015 A | 7/1991 | (GB) . |
| 2 240 016 A | 7/1991 | (GB) . |
| 2 245 460 A | 1/1992 | (GB) . |
| 2 275 403 A | 8/1994 | (GB) . |
| 2 288 304 A | 10/1995 | (GB) . |
| WO 85/00913 | 2/1985 | (WO) . |

OTHER PUBLICATIONS

Pyramidal Parametrics, L. Williams, Computer Graphics Lab., vol. 17, No. 3, Jul. 1983 (1 page).

Foley et al "Computer Graphics Principles and Practice" pp. 890–893 (1990).

Foley et al *Computer Graphics Principles and Practice* pp 890–893 (1990).

*Primary Examiner*—Mark Zimmerman
*Assistant Examiner*—Huedung X. Cao
(74) *Attorney, Agent, or Firm*—Flynn, Thiel, Boutell & Tanis, P.C.

(57) ABSTRACT

A three dimensional image is textured for display on a screen by firstly receiving data comprising the location of each elementary area (pixel) of the screen and associated image data for that pixel. Texture image data is retrieved from a memory means in dependence on the image data and an appropriate portion of that texture image data is mapped onto the pixel. The number of pixels which share the same associated image data is determined and an incremental change in the mapping of the texture data onto pixels corresponding to a one pixel increment is also determined. For each pixel sharing the same image data as an adjacent pixel the previously derived texture image data for that adjacent pixel is combined with the incremental change in texture image data to thereby derive texture image data for that pixel.

13 Claims, 6 Drawing Sheets

TEXTURING AND SHADING OF 3-D IMAGES

This is a division of Ser. No. 08/928,955, filed Sep. 12, 1997, which is a divisional of U.S. Ser. No. 08/593,649, filed Jan. 29, 1996 (now abandoned).

This invention relates to texturing and shading of 3-D images for display on a screen.

BACKGROUND TO THE INVENTION

The method most commonly used by commercial systems to generate textured and shaded real-time 3-D images uses a Z-buffer system. This is one of simplest visible-surface algorithms to implement in either software or hardware and is used by such companies as Silicon Graphics, Evens & Sutherland, and Hewlett Packard.

It requires that we have available not only a frame buffer in which colour values are stored, but also a Z-buffer, with the same number of entries, in which a z-value is stored for each pixel. Polygons, normally triangles, are rendered into the frame buffer in arbitrary order. During scan-conversion, if the polygon point is not further from the viewer than the point already in the buffer, then the new point's textured and shaded colour is evaluated and the z-value replaces the old value. No pre-sorting is necessary and no object-object comparisons are required.

The term "Texture Mapping" refers to the process of transforming a 2D array of pixels onto another 2D array of pixels. The transformation can be completely arbitrary, but in this document we will consider perspective mapping. Perspective mapping effectively takes a 2D array of pixels, rotates and translates them into 3D and then projects them onto a z=n plane for display.

Texture mapping is used in computer graphics to try to mimic the surface detail of real objects. Using perspective mapping, it is possible to place a picture (e.g. the surface of wood onto a 3D object (e.g. a table). The result being that the table has the appearance of wood.

The equation for perspective mapping is given below.

$$u = \frac{ax+by+c}{px+qy+r} \quad v = \frac{dx+ey+f}{px+qy+r}$$

'u' and 'v' are the 2D coordinates in texture space.

'x' and 'y' are the 2D coordinates in screen space.

'a', 'b', 'c', 'd', 'e', and 'f' are the coefficients used in the mapping process.

Sampling a signal that has frequencies above half the sample rate causes aliasing. Texture mapping is a re-sampling process which can easily cause aliasing. To produce a texture mapped image that does not alias, one has to low pass filter the image in texture space to half the sample rate of the mapping. A complication to the situation is that the sample rate may vary depending on the position in screen space.

Figure 1:
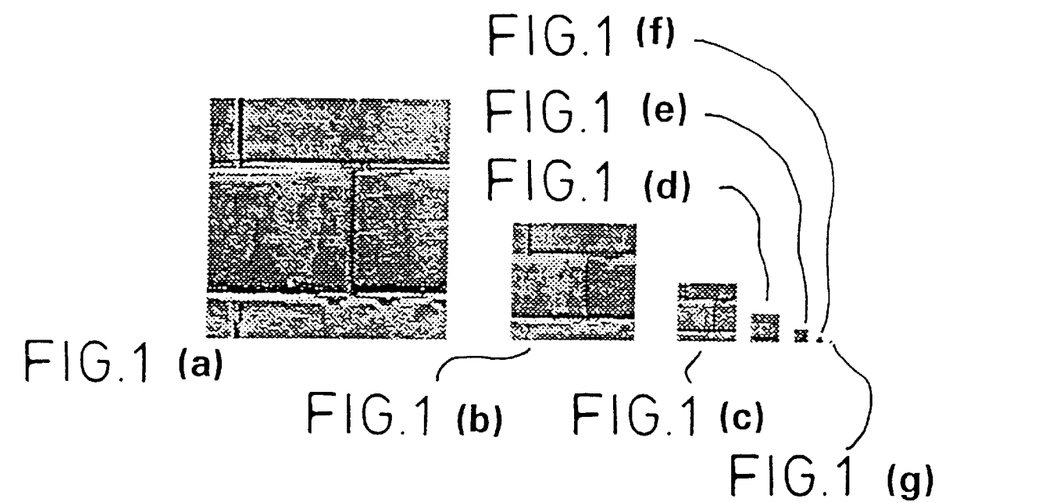
FIGS. 1(a), 1(b), 1(c), 1(d), 1(e), 1(f), and 1(g) show different resolutions of mip map data.

To correctly filter the image, one requires a large amount of processing. There are many ways to approximate the correct filtering with mathematically simpler operations. The simplest method is MIP Mapping where MIP stands for MULTIM IMPARVO MIP Mapping requires a pre-processing stage where a texture map stored in memory is filtered and decimated to half the resolution. This is repeated until the resulting image is 1 pixel in size (this does assume that the texture is square and a power of 2). FIGS. 1(a) through 1(q) show an example of a brick texture at 128×128 resolution with the associated lower MIP Map levels.

A MIP Map can be thought of as a pyramid of images. The MIP Map is accessed through 3 variables 'u', 'v' and 'D'. The variables 'u' and 'v' are the coordinates of the pixel in texture space that is required to be anti-aliased. The variable 'D' is a measure of how filtered that pixel is required, i.e. how high up the pyramid. The value D=1 means that the full resolution image is used. The value D=2 means the half resolution image is used, and so on. When values of 'D' are not powers of 2, a blend of the two nearest mip-map levels are calculated using linear interpolation in a well know manner.

Ideally, 'D' is the square root of the area that the screen pixel covers when it is transformed into texture space. Unfortunately, this is extremely expensive to calculate on a pixel by pixel basis.

P. S. Heckbert (Comm ACM 18 (6) June 1975) suggested using the following approximation for 'D':

$$D^2 = \text{MAX} \frac{du^2}{dx} + \frac{dv^2}{dy}, \frac{du^2}{dy} + \frac{dv^2}{dy}$$

Although this method is far simpler than the ideal, it still requires a square root, and two additional mappings per pixel.

Shading is a term used in computer graphics which refers to part of the process of evaluating the colour of a surface at a particular screen position. When a surface is shaded, the position, orientation, and characteristics of the surface are used in the modelling of how a light source interacts with that surface.

The realism of computer generated images depends considerably on the quality of this illumination model. Unfortunately an accurate lighting model is too expensive to use in a real time rendering system. It is therefore necessary to compromise and use approximations in the lighting calculations.

The most common form of approximation is diffuse or lambert shading, which simulates the light reflected from matte components of materials. This is illustrated in FIG. 2 and the following equation:

$$I(L, S, \theta) = \begin{cases} LS(\cos\theta) & \text{if } (\cos\theta) \leq 0 \\ 0 & \text{if } (\cos\theta) < 0 \end{cases}$$

Figure 2:
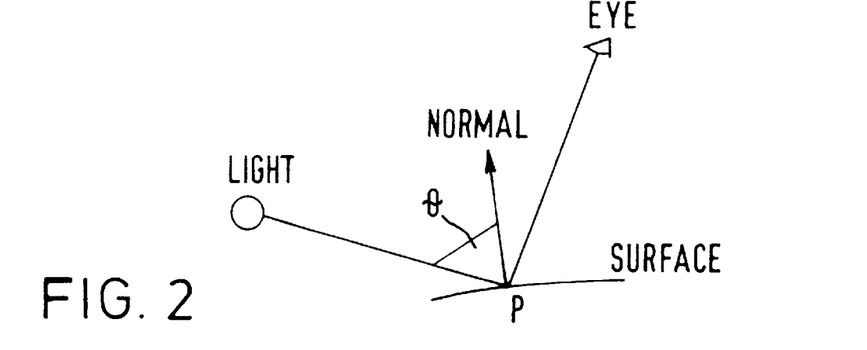
FIG. 2 shows a diffuse shading diagram.

FIG. 2 illustrates a light ray emanating from the eye or camera, (which passes through a particular screen pixel) and strikes a surface at a given point, P. It also shows the vector, the normal, which is perpendicular to the surface at P, and a ray from a light to P.

The equation states that the intensity (or colour), I, of the diffuse illumination at P is the product of the light's intensity, L, the diffuse reflectivity of the surface, S, and the cosine of the angle between the light ray and the normal θ.

This calculation can either be assumed constant for an entire surface, which is known as flat shading, or can be interpolated in various ways across polygonal facets to stimulate curved surfaces. Couraud shading (Comm ACM 18(60) pp. 311–17, 1971) for example, is the linear interpolation of the diffuse colours across the polygonal facets.

An alternate manner of interpolation is to linearly interpolate the surface normals, in the above equation. This method was proposed by Bui Thuong Phong. (Comm ACM 18(6) June 1975). Unfortunately, this computation is relatively expensive. An effective approximation has been proposed by Bishop and Weimer (Computer Graphics 20(4) pp. 103–6, 1975) which uses 2 dimensional Taylor series approximations. These approximations can be evaluated efficiently using differences equations. Apart from a small precalculation overhead, the cos θ, can be approximated at the cost of only 2 addition per pixel.

The next most common lighting feature that is simulated is glossy or specular highlights. These are the reflections of the lights in a scene. Specular highlights give surfaces a reflective appearance, and greatly improve the realism of images. They are most commonly approximated by a method again described by Bui Tuong Phong, which is illustrated in FIG. 3 and in the following equation.

$$I(L, S, \theta, n) = \begin{cases} LS(\cos\theta)^n & \text{if } (\cos\theta) \geq 0 \\ 0 & \text{if } (\cos\theta) < 0 \end{cases}$$

Figure 3:
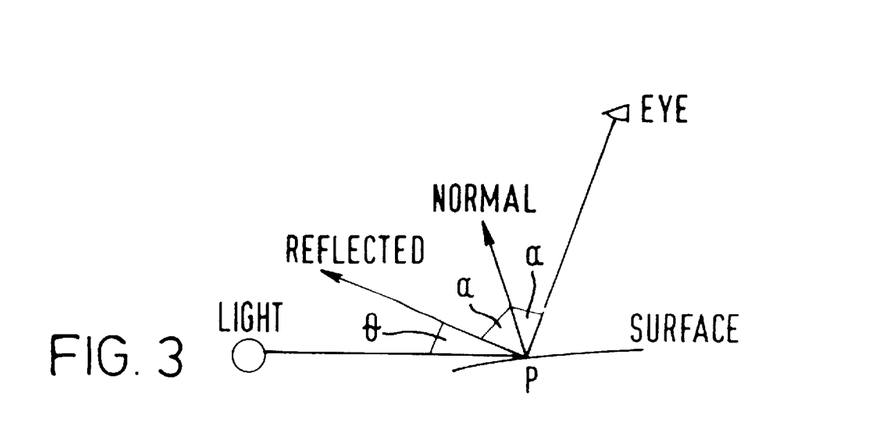
FIG. 3 is a specular highlights diagram.

FIG. 3, illustrates a 'ray' emanating from the eye or camera, which passes through a particular pixel, and strikes a surface at a given point, P. It is then reflected in the shown direction using the usual mirror angles. Note that because surfaces are not perfectly smooth, the reflected ray is assumed to spread out to some degree, governed by the roughness of the surface. Finally, FIG. 3 also shows a ray coming from a light which will appear as a highlight. The closer the reflected direction is to the light, the brighter the highlight will appear.

The equation describes the intensity of the highlight, I, as a function of the intensity of the Light, L, the reflectivity of the surface, S, the angle between the reflected direction and the light, θ, and the smoothness of the surface, n. This function means that as the reflected direction approaches the light direction, (i.e. θ gets small), the intensity of the highlight reaches a maximum, and falls off in other areas. The larger the value of n, the faster the fall off, the smaller the highlight and hence the smoother the surface appears. To be most effective this calculation needs to be referred to as the power function. Typical values of n range from 1 to 1000.

Bishop and Weimer again propose computing part of the above equation using 2 dimensional Taylor series approximations (see diffuse shading), and then using a look-up table to calculate the power function.

DRAM is an acronym for Dynamic Random Access Memory. The structure of 'page mode' DRAM can be broken down into banks, pages and locations. A location is the atomic addressable memory element. A number of contiguous locations make up a page, and a number of pages make up a bank.

When a device requests the contents of a location, the page that contains that location is opened and the data is fetched. If the next location requested falls within the same page, the page does not have to be re-opened before fetching the data. As the time taken to open a page is significant, it is much faster to request random locations within a page than to request random locations outside a page. The term 'page break' refers to fetching the contents of a location from within a page that is not open.

In a memory configuration that has multiple banks, it is possible to keep more than one page open at a time. The restriction is that the open pages have to be in different banks.

SRAM is an acronym for Static Random Access Memory. The structure of SRAM is simpler than that of DRAM. Any location within the device can be fetched within a single clock cycle. The disadvantage of this simplicity is that the density of memory elements on the Silicon is much less than that of DRAM. As a result, SRAM is considerably more expensive than DRAM.

The atmospheric effect of fogging adds a dimension of realism to a generated 3D scene. It is not just useful for scenes that look foggy, all out door scenes require fog. In an out door scene, objects in the distance have less vibrant colours. This effect is the same as fogging, the objects 'grey out' with distance.

If one assumes that the fog does not vary in density, then light is attenuated as a percentage per meter. For example, if the light is attenuated by 1% per meter, in 1 meter the light will be 0.99 of what it was. In 2 meters, the light will be 0.99*0.99=$0.99^2$=0.98 of the original. In 'n' meters, the light will be $0.99^n$ of the original.

A problem with texturing and shading in conjunction with a Z-buffering system is that each screen pixel may have it's colour evaluated many times. This is because the surfaces are processed at random and the closest surface to the eye may change many times during the processing of the scene.

A deferred texturing and shading architecture embodying one aspect of the present invention eliminates the wasted calculation by only evaluating a single colour for each screen pixel. Each surface within the scene has a unique 'tag' associated with it. To process a pixel, the hidden surface removal is performed which results in the tag of the closest surface to that pixel being calculated. This tag value is used to fetch the instructions that will correctly texture and shade that pixel.

The embodiment described in this document, provides a highly efficient and optimised architecture which particularly lends itself to systems that require deferred texturing and shading. For a complex system, such as the one described here, it is very important to ensure that the best balance between complexity (hardware size/Silicon area) and functionality is carefully achieved. This means that the overall system architecture, including interactions between major blocks, as well as the detail of low level methods used in each block, must be carefully designed as selected. Of particular importance are:

1. Data organisation and memory architectures that ensure minimisation of bottlenecks;
2. Partitioning of resources in terms of various functional blocks, memory cache requirements, and their interaction;
3. Complexity levels in terms of numerical precision, and the extent of approximations used in the method used to implement the functions required in each block;
4. Support for adequate levels of flexibility within hardware/ Silicon budget.

The embodiment described here uses careful algorithmic and simulation analysis to strike a balance across the above issues.

One of the rate determining steps of a system that performs MIP-mapping, is fetching the texture pixels from memory. To keep the bandwidth high, some designs use fast SRAM. Although this can deliver the desired performance, the cost of such a solution is prohibitive.

The proposed architecture in a preferred embodiment of the invention stores the MIP-MAP data in page mode DRAM. To obtain the highest data throughout, the number of page breaks have to be reduced to a minimum. The simplest method of storing a MIP-Map would be to arrange the D levels contiguously, and within the maps, the pixels stored in scan order. Because of the nature of access to the MIP-Maps, this method of storage would break page on almost every access. A memory structure that optimises the number of page breaks.

The coefficients of the texturing equation described above are potentially unbounded. Even when sensible bounds are enforced, there are a large range of values required. Implementing the equation using purely fixed point arithmetic would need high precision multipliers and dividers. Such hardware would be large and slow, thus impacting on the price and performance of the system. A mixed floating and fixed point method embodying another aspect of the invention which has two advantages is described. Firstly, the size of the multipliers and dividers can be reduced, and secondly, the complexity of implementing full floating point arithmetic is avoided.

The texture mapping equation requires one division per pixel. Most hardware division architectures use some successive approximation method which requires iterating to the desired accuracy. This interation has to be performed in time (multiple clock cycles), or in space (Silicon area). A new method and architecture is described embodying a further aspect of the invention for evaluating a reciprocal to the desired accuracy without any successive approximation.

The variable 'D' is a measure of how filtered a textured pixel is required. Heckbert's approximation to 'D' is quite computationally expensive, requiring a square root, and two additional mappings per pixel. A new method of calculating 'D' is described which is simpler.

Fetching the parameters used in the texturing and shading process impacts on the rate that the pixels can be processed. The order in which the parameters are required are not completely random, and a locality of reference can be exploited. The architecture described includes a parameter cache which significantly improves the performance of the overall design.

To control the intensity of size of a specular highlight, a power function is generally used. This can be expensive to implement—either an approximation through a large ROM lookup table, or explicit implementation of an accurate power function are two possibilities. Since the highlight equation is just an approximation, the function does not have to be a perfectly accurate power function.

Assuming a method of calculating, or approximating cos θ exists, then the power function is merely the computation.

$$x^n \text{ where } 0 \leq x \leq 1$$

It is also not necessary to have fine control over the granularity of n, a few integer values will suffice. Noting that $$(1-y)^{2n} \approx (1-2y)^{2n-1}$$

when y is small, then the following approximation will be used to raise x to a power n, when x is in the above range.

$$x^n \approx (1-\max(1, (1-x).2^k))^2$$

where k is the integer part of $(\log_2 n) - 1$. The value k effectively replaces the value n, as part of the surface properties.

Computation of two substraction's, is relatively inexpensive. Multiplying a value by $2^k$ in binary notation is merely a shift left by k places, and the Max. computation is also a trivial operation. The square operation is then a multiplication of a value of itself.

The method is applicable to both hardware and firmware implementations.

To calculate the attenuation factor when fogging a scene requires the density of the fog to be raised to the power of the distance between the object and the viewer. An efficient method of approximating this function is described.

Preferred embodiments of the invention are now described in detail, by way of example, with reference to the appended drawings in which:

BRIEF DESCRIPTION OF THE DRAWING

FIGS. 6(a) and (B) show how the bits are in fact interleaved;

DETAILED DESCRIPTION

Figure 5:
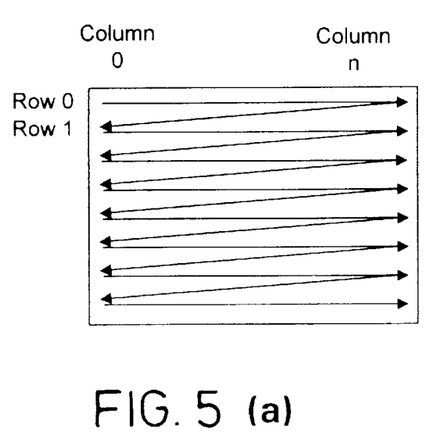
FIGS. 5(a) and 5(b) show a comparison between conventional scanning of memory addresses and scanning with interleaved address bits.

FIGS. 5 and 5B respectively is a diagrammatic representation of the main data flows through the system.

The input to the system is an 'x,y' coordinate, a Tag, and some optional 'pixel specific data' of the type that can be generated with the system described in our British Patent Application No. 9414834.3. The input pixel data is received in 'scan order' or 'Tile order'. Scan and Tile order are shown in FIG. 5.

An advantage of receiving the data in 'Tile order' is that local pixels in the image are transmitted closer together than in 'scan order'. The locality of reference improves the performance of the Parameter Cache.

The Tag, as explained above is a unique identifier associated with each potentially visible surface in the scene.

The 'pixel specific data' are attributes of the pixel that have been evaluated outside the system. These attributes are used in the evaluation of the pixel colour. For example, in the system described in the patent application "Shading Three-Dimensional Images" (Application No. 9414834.3), each pixel has data associated with it which describes whether a shadow is being cast upon it. This information can be accounted for when evaluating the pixel colour.

Figure 4:
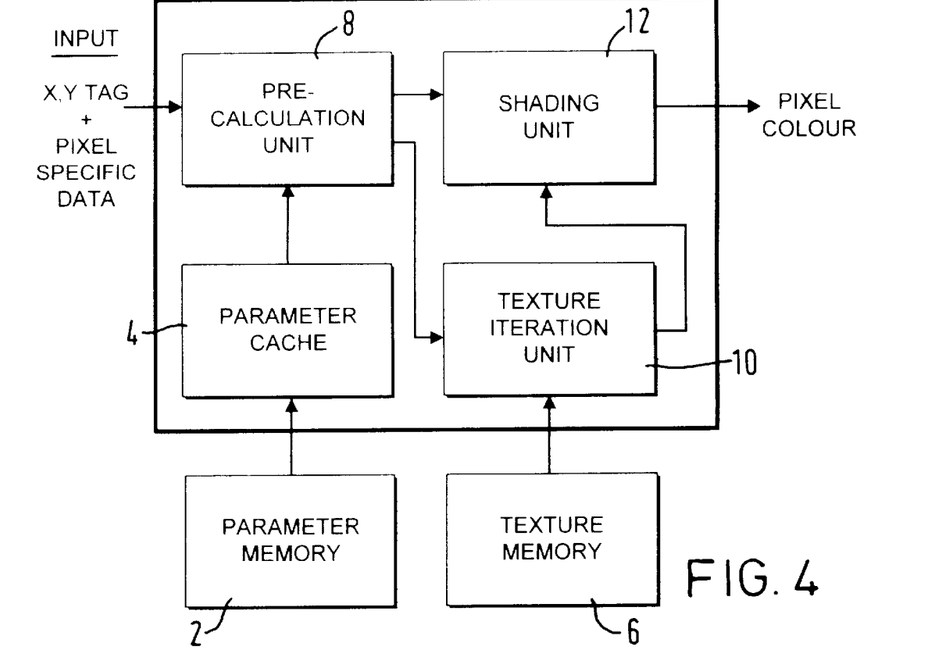
FIG. 4 is a block diagram of the system architecture employed for shading.

The pixel Tag is used as an index into a Parameter Memory 2. This stores the parameters defining the surface visible at each pixel. The data stored at the indexed position is used in the evaluation of the pixel colour (e.g. the coefficients of the texture mapping equation).

As a Tag appears at more than one pixel position, the data associated with that Tag may be required more than once since several pixels will be used to display the same visible surface. Therefore, it is possible to improve the performance of fetching parameters by inserting a parameter cache 4 in the data path. In simulations, a 2-way Set associative cache gave the best complexity/performance ratio.

The texture memory 6 is made up of a number of banks of DRAM containing the Mip-Map data. Once the 'u.v' coordinate of the input pixel, has been evaluated, the associated Texels (elementary areas in the texture memory) are fetched from the texture memory.

The texture mapping equation has been broken down into two stages, a Pre-calculation and an Integration stage. In the Pre-calculation unit 8, the parameters are fetched, then 'ax+by+c', 'dx+ey+f', and 'px+qy+r' are evaluated. Also, the unit counts how may contiguous pixels share the same Tag value. This count, along with the above values are transferred to he Texture Iteration Unit 10.

The Texture Iteration Unit 10 takes the values from the Pre-calculation Unit 8 and performs the two divisions, thus completing the 'u,v' evaluation. If the count value from the precalculation is greater than 0, then the differences between the current and next pixel (ie. 'a', 'd' and 'p') are added onto the pre-calculated values ('ax+by+c', 'dx+ey+f', and 'px+qy+r'), and the two divisions are repeated. The step is iterated the number of times specified by 'count'.

Once the colour from the Texture Iteration Unit has been calculated, it is passed onto the Shading Unit 12. The parameters pointed to by the pixel Tag are not just texturing co-efficients, they also contain information for use by the Shading Unit in evaluating the final pixel colour.

The simplest form of shading calculations performed are a function of the 'x,y' screen position, such as Linear and Quadratic Shading.

Linear shading computes an equation of the form:

$$I(x,y)=T_2x+T_1y+T_0$$

where I, is the intensity (or colour), x and y are the screen pixel coordinates, and $T_2$, $T_1$, $T_0$ are constants. This can be split into precalculation and interation parts in the same manner as the texturing.

The output is constrained to lie in the range 0 . . . 1.

Quadratic shading gives a better approximation of functions, but at a greater cost of implementation. It is implemented by a function of the form:

$$I(x,y)=T_5x^2+T_4xy+T_3y^2+T_2x+T_1y+T_0$$

where I, is the intensity (or colour), x and y are the screen pixel coordinates, and $T_5$, $T_4$, $T_3$, $T_2$, $T_1$, $T_0$ are constants. This can be split into precalculation and iterations parts in the same manner as the texturing.

The output is constrained to lie in the range 0 . . . 1.

The quadratic function may be raised to a power using the previously discussed power function.

After a pixel has been textured and shaded, it is output to a frame store. In turn, the pixel is fetched from the frame store and sent to a display device.

Figure 11:
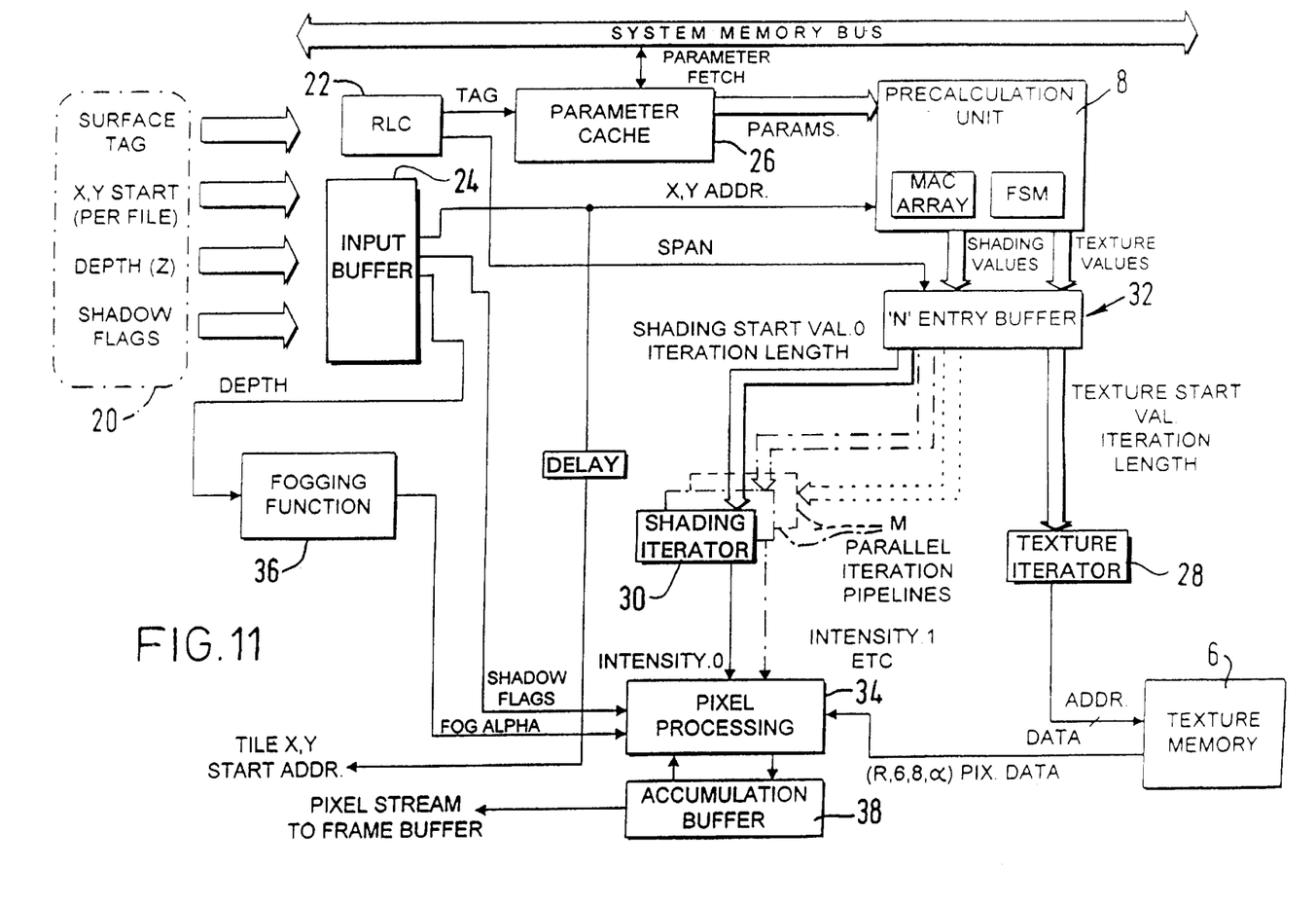
FIG. 11 is a detailed implementation of FIG. 4.

A highly optimised architecture which is a preferred embodiment of the invention is shown FIG. 11.

Input data 20 to the system may derive from any hidden surface removal and depth sorting apparatus which stores tags rather than pixel data as its output. Such a system is described in British Patent Application 9414834.3. Input data comprises a Surface Tag which is unique for each surface in a scene, a Block X,Y address which is the start address of the current block of pixels being input to the system, a Depth(Z) value which is the depth of pixel being currently input and lastly the Shadow Flags which indicate whether the current pixel is in the shadow of one or more shadow lights.

The surface tags for a given block are run length coded as <surface tag:span length (number of pixels for which parameters remain the same> and stored in a tag buffer 22. The other input parameters are stored in an input block buffer 24 on a per pixel basis.

Spans are compared against a parameter cache 26. It is desirable that the blocks be input in a tiled format so that vertical as well as horizontal coherency of a given scene can be exploited by the cache. The degree of associativity of the cache is a matter left for individual system cost/performance tradeoffs. Where the cache hits, the corresponding surface parameter list is passed directly to the precalculation unit 8. In the case of a cache miss, the parameter list is fetched from system memory, stored and forwarded to the precalculation unit. Since the cache is designed for a high hit rate, any subsequent miss penalty on the system memory bus bandwidth is small, negating the requirement for a separate parameter memory.

The precalculation unit 8 takes the block start address (from which the span start address is derived) along with the current parameter list and calculates the initial values for any or all of the texture and shading iterators, as specified in the parameter list. In doing so it implements the scan line texture address and shading intensity algorithms described above. It would typically consist of an array of multiply accumulators controlled by a microsequencer.

The precalculation buffer 32 allows cache miss penalties and precalculation overheads to overlap the texture and shading iteration process, thus increasing system throughput.

The texture iterator performs the hyperbolic interpolation in u,v and the MIP map 'D' calculation as described below. The outputs of the texture iterator comprise pairs of texture memory 6 addresses, such that texture values from the two appropriate MIP maps are fetched and forwarded to the pixel processing unit 34.

The number of shading iterators, 30 depends on the degree of parallelism required for shading functions. For example, two units would allow simultaneous evaluation of a global lighting intensity and a shadow light intensity for smooth shaded surfaces. Alternatively, the units could be used to calculate in parallel the diffuse and specular components of a Phong shaded surface. The iterators implement the algorithm described below. The outputs of the shading pipelines comprise a set of intensity values which are forwarded to the pixel processing unit.

The fogging unit 36 takes the stored depth values from the input block buffer and implements a pseudo exponential fogging function as described below. These values are forwarded to the pixel processing unit where they are used to interpolate between a calculated pixel colour and a fog colour.

The pixel processing unit 32 implements the final R.G.B colour evaluation of each screen pixel. A base colour or texture colour is input and multiplied by the conditional sum of all relevant light source intensity values from the shading iterators as dictated by the shadow bits. Any highlight offsets are also summed in. The pixels are then fogged and transferred to a block accumulation buffer 38.

The architecture described herein allows for a number of advanced features to be supported. Note that this requires a compatible hidden surface removal and depth sorting system such as that described in British Patent Application 9414843.3.

1) Translucent surfaces: Translucent objects can be rendered using a multi pass technique. First the opaque surfaces in a block are processed and transferred to the accumulation buffer as described above. The translucent surfaces are then processed in a similar manner, with the exception that all translucent surfaces will have an 'alpha' component as part of their parameter list or texture data which is used to mix between the current pixel and the corresponding background pixel stored in the accumulation buffer. When all translucent pixels have been processed the contents of the accumulation buffer are streamed out of a frame buffer.

2) Anti Aliasing: This can be achieved using a multipass technique. In this method each block is processed a number of times at sub pixel increments in X and Y. The resultant pixel colours are accumulated in the block accumulation buffer. When the passes are complete the pixels are divided by the number of passes and treamed to a frame buffer.

3) Motion Blur: This is achieved by supersampling the object to be blurred in time, then averaging the samples using the block accumulation buffer as described above.

4) Soft Shadows: This effect can be simulated using a multipass technique whereby the shadow light sources are jittered between passes, then the samples averaged using the block accumulation buffer as described in 2).

5) Searchlight effects: This is the effect of a torch beam or headlight projecting a pool of light onto an area of a scene. This can be implemented by suitable setting of the shadow bits such that both shadow volumes and light volumes can be represented. Soft edges can be simulated as described above.

To the problem of storing texture maps in scan order and the resulting page break problems was discussed above. This will be more thoroughly explained here.

When texturing a given screen pixel, a texture map must be accessed to get the required texture pixel, or texel, or in the case of MIP mapping, a number of texels, that map to the screen pixel.

To access the correct texel in memory, a function of the form.

Texel_address=Texture_base_address+Offset_Func (u.v) must be computed to find the texel's location. The texture_base_address, is the starting location of the given texture of MIP_map level in texture memory, and u,v are the calculated integer texture coordinates. The offset_func maps the u,v coordinates to an offset in the texture map.

Figure 6:
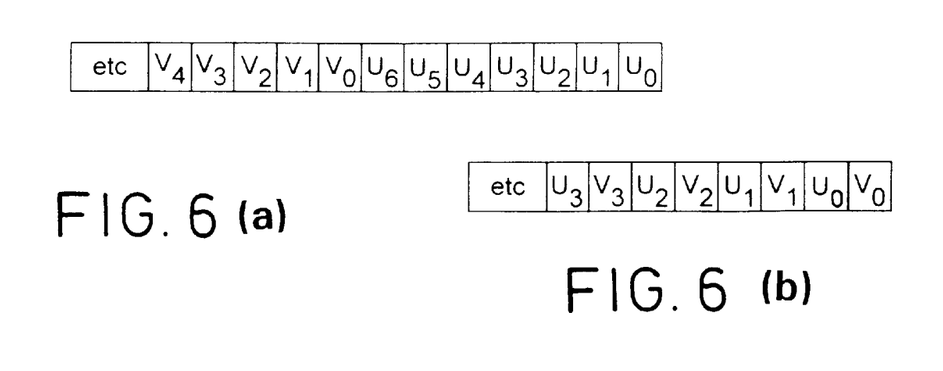

If textures are stored in scan line order, then the offset function is:

offset_func($u.v$)=$u$+size*$v$ where size is the u dimension of the texture map. Since the dimensions of texture maps are powers of 2, the above multiplication is just a shift left operation in binary notation, and the addition is simply a concatenation of bits. The resulting function, for a 128×128 texture map is shown in FIG. 6a in the scan order. (Note $v_x$ refers to the xth bit of v, with the least significant bit numbered as 0).

The problem with this is that as soon as v index changes by any amount, the resulting offset changes dramatically. These dramatic changes will result in large numbers of page breaks which will badly affect texturing performance. Generally, textures coordinates will change gradually, BUT they are equally likely to vary in the u and/or v directions.

A more efficient method or arranging the texture map is to interleave the u and v index bits. One such method, which has $v_0$ in the least significant bit, is shown in FIG. 6b under the optimised function. (It is also possible to start with the U).

Figure 7:
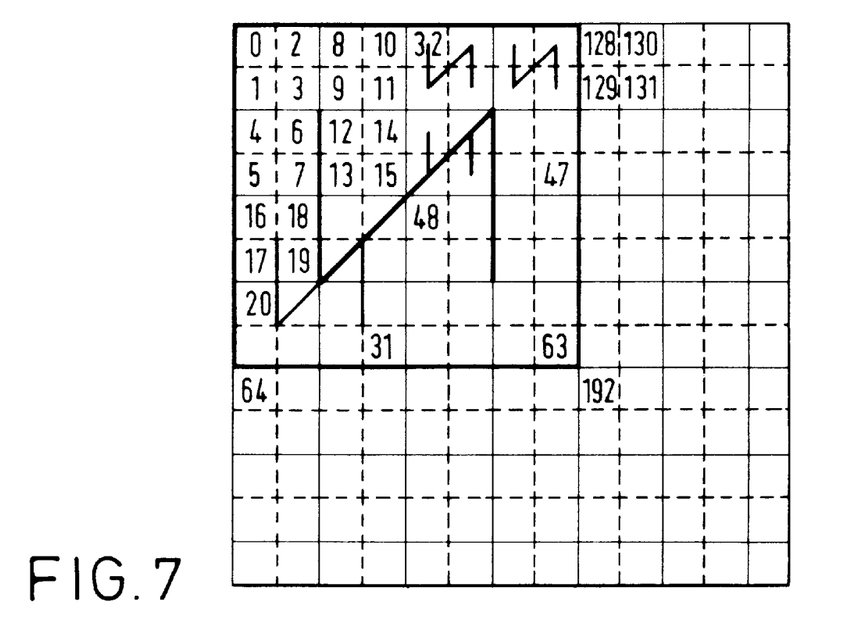
FIG. 7 shows in more detail the order in which physical memory locations are addressed by the interleaved address bits.

This arrangement keeps many adjacent pixels (adjacent in both u and v) relatively close in the texture memory, therefore reducing the page breaks. FIG. 7 shows the top left corner of a texture map. The numbers in each pixel show the offset at which the pixels are stored.

This structure is best described as Fractal. The pattern is a self-similar rotated 'Z', i.e. a zigzag starts at the pixel level, and continues with larger and larger groups of pixels.

An additional problem is introduced with the requirements of Mip-Mapping. The process of Mip-Mapping usually requires access to two adjacent levels of the Mip-Map for each screen pixel calculation. If the Mip-Map levels are stored contiguously, then a pixel fetch from two levels will be too far apart to stay within one DRAM page, thus a page break would occur at each pixel access.

To avoid this overhead requires the use of DRAM Banks. In a memory configuration that has multiple banks, it is possible to keep more than one page open at a time. The restriction is that the open pages have to be in different banks. Therefore, if consecutive Mip-Map levels are stored in separate banks, then page breaks would not occur on each pixel fetch.

Figure 8:
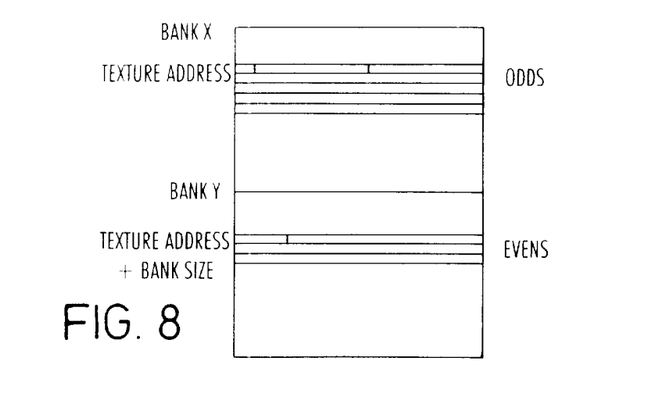
FIG. 8 shows storage of one set of mip map data in two memory banks.

To further the explanation, the following naming convention will be used. The Mip-Map levels will be numbered from '0' to 0 refer to the 1×1 resolution map, 1 refers to a 2×2 map, and so on. FIG. 8 shows all the odd numbered Mip-Map levels as a contiguous block in one bank, and all the evens in another.

The arrangement does present a problem when adding further Mip-Mapping textures to the memory. The memory requirements in bank Y is roughly 4 times that of a Bank X. As the banks are the same size, bank Y will fill up long before bank X. This problem can be avoided by toggling which bank the odd Mip-Map levels are stored in. Unfortunately, this arrangements would require separate base addresses for the odd and even block of data.

Figure 9:
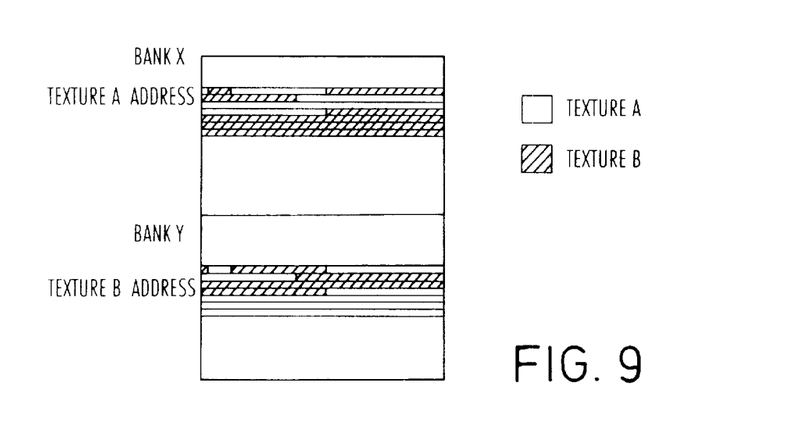
FIG. 9 shows storage of two sets of mip map data in two memory banks.

A better solution is to interleave pairs of Mip-Map as shown in FIG. 9. Texture A has its lowest resolution map (1×1) at the base address in bank X. The next map (2×2) is at the consecutive address in bank Y. Texture B has its 1×1 map at the base address in bank Y, and its 2×2 map at the consecutive address in bank X.

The texture mapping equation described in above requires 6 multiplication's, 6 additions and 2 divides for each Textured screen pixel. To reduce the computational requirement, a difference equation is used.

As the input pixel stream is being sent in scan order, there will be horizontal spans of pixels that share the same texturing function. A difference equation in the X dimension would reduce the computational requirement within the span.

$$u(x, y) = \frac{ax + by + c}{px + qy + r} = \frac{\alpha(x, y)}{\beta(x, y)}$$

$$u(x+1, y) = \frac{a(x+1) + by + c}{p(x+1) + qy + r} = \frac{\alpha(x, y) + a}{\beta(x, y) + p}$$

$$v(x, y) = \frac{dx + ey + f}{px + qy + r} = \frac{\lambda(x, y)}{\theta(x, y)}$$

$$v(x+1, y) = \frac{d(x+1) + ey + f}{p(x+1) + qy + r} = \frac{\lambda(x, y) + d}{\theta(x, y) + p}$$

The start of the span requires the complete calculation, but subsequent pixels only require 3 additions and 2 divides.

The architecture for the texture mapping calculation has been split into two units, A Pre Calculation Unit and an Iteration Unit. The Pre Calculation unit evaluates ax+by+c, dx+ey+f, and px+qy+r. The Iteration Unit performs the division and the addition of 'a', 'd', and 'p'.

After detailed investigation of the visible effects of arithmetic precision in different areas of the texturing, a mixed floating and fixed point method was decided to be the most appropriate.

The coefficients 'p', 'q', and 'r' are integers, so the evaluation of 'px+qy+r' just require integer multiplication and integer addition.

The coefficients 'a', 'b', 'c', 'd', 'e' and 'f' share a single power of two exponent which is stored along with the rest of the texturing coefficients. The evaluation of 'ax+by+c' and 'dx+ey+f' are identical to that of 'px+qy+r', except the exponent co-efficient is also communicated to the division unit.

The division is performed in floating point. The evaluated terms 'ax+by+c', 'dx+ey+f', and 'px+qy+r' are turned into floating point numbers with a mantissa and a power of 2 exponent. The result of the division is then turned into an integer for use in the address generation.

The current design uses 16 bit coefficients and a 14 bit reciprocal mantissa.

The two divides are performed by a single reciprocal and two multiplication's. The input to the reciprocal unit is a fixed point number in the range 0.5 to 0.9999 and the output is in the range 2 to 1.

The most appropriate method of performing this function is with a compressed lookup table. The function is required to be accurate to 14 Bits. This means that 0.5 is represented as 0x2000 (hex), 0.9999 is represented as 0x3fff. To store the data completely uncompressed would require 8192 locations of 14 Bits each (14 KB). The top bit of the reciprocal can be removed because it is always 1. This reduces the storage to 8192 location of 13 Bits each (13 BK).

The method of compressing the data is to store the differential of the reciprocal. If the operand is greater than 0.707, the reciprocal varies by either 1 or 0. Therefore, these differences only require 1 Bit of storage. Below 0.707, the reciprocal varies by either 2 or 1 which can also be stored in 1 Bit. This method of compression would reduce the memory requirements to 1.375 KB. The following table shows a few reciprocals and the differences between them.

| Operand | Reciprocal | Difference |
|---------|------------|------------|
| 0 × 3FFF | 0 × 2000 | — |
| 0 × 3FFE | 0 × 2001 | 1 |
| 0 × 3FFD | 0 × 2001 | 0 |
| 0 × 3FFC | 0 × 2002 | 1 |
| 0 × 3FFB | 0 × 2002 | 0 |
| 0 × 3FFA | 0 × 2003 | 1 |
| 0 × 3FF9 | 0 × 2003 | 0 |
| 0 × 3FF8 | 0 × 2004 | 1 |
| 0 × 3FF7 | 0 × 2004 | 0 |

To uncompress the data, a sum of differences is performed. For example, to calculate the reciprocal of 0x3FFB, the difference bits for 0x3FFF through to 0x3FFB are summed, then added onto 0x2000 (1+0+1+0+0x2000= 0x2002). When the operand drops below 0.707, the difference can either be 2 or 1. These differences are stored as a single bit, but interpreted as 2 and 1 when it comes to summing the differences.

This method of compression/decompression is impractical to implement in a small number of clock cycles because of the large number of summations required. A slightly less efficient compression method can vastly reduce the number of summations. Every 32'nd reciprocal value is stored in full, along with the differences of the intervening 31 numbers. The following table shows the first few entries of this data.

| Operand | Reciprocal | Intervening Differences |
|---------|------------|-------------------------|
| 0 × 3FFF | 0 × 2000 | 10101010101010101010101010101 |
| 0 × 3FDF | 0 × 2010 | 10101010101010101010101010101 |
| 0 × 3FFF | 0 × 2020 | 10101010101010101010101010101 |

To find the reciprocal of 0x3FDA, for example, the operand is first rounded up to the nearest number that has a whole reciprocal associated with it (0x3FDF). The difference between these values is the number of differences to be summed (0x2010+1+0+1+0+1=0x2013).

The method proposed stores a series of base values and offsets. The incoming operand of 'n' bits is considered in two parts, as two separate numbers:

'a' most significant bits referred to as the number K), and

'b' least significant bits (referred to as the number L).

The base values are read from a ROM using K as the ROM's address, and the offsets are read from another ROM (called the "Delta ROM") at the same address.

The method is then to count the number of 1's that occur in the first L bits of the data from the Delta ROM, which gives the offset from this base value which must be added to the base value in order to arrive at the reciprocal. If the offset value corresponds to case one above, then:

(i) offsett=(sum of the number of 1's in the first L bits of the Delta ROM) if it corresponds to case two above, then:

(ii) offset=(sum of the number of 1's in the first L bits of the Delta ROM+L this second case effectively corrects for the value from the Delta ROMrepresenting 1 or 2 whist they are represented as '0' or '1' in binary.

Figure 12:
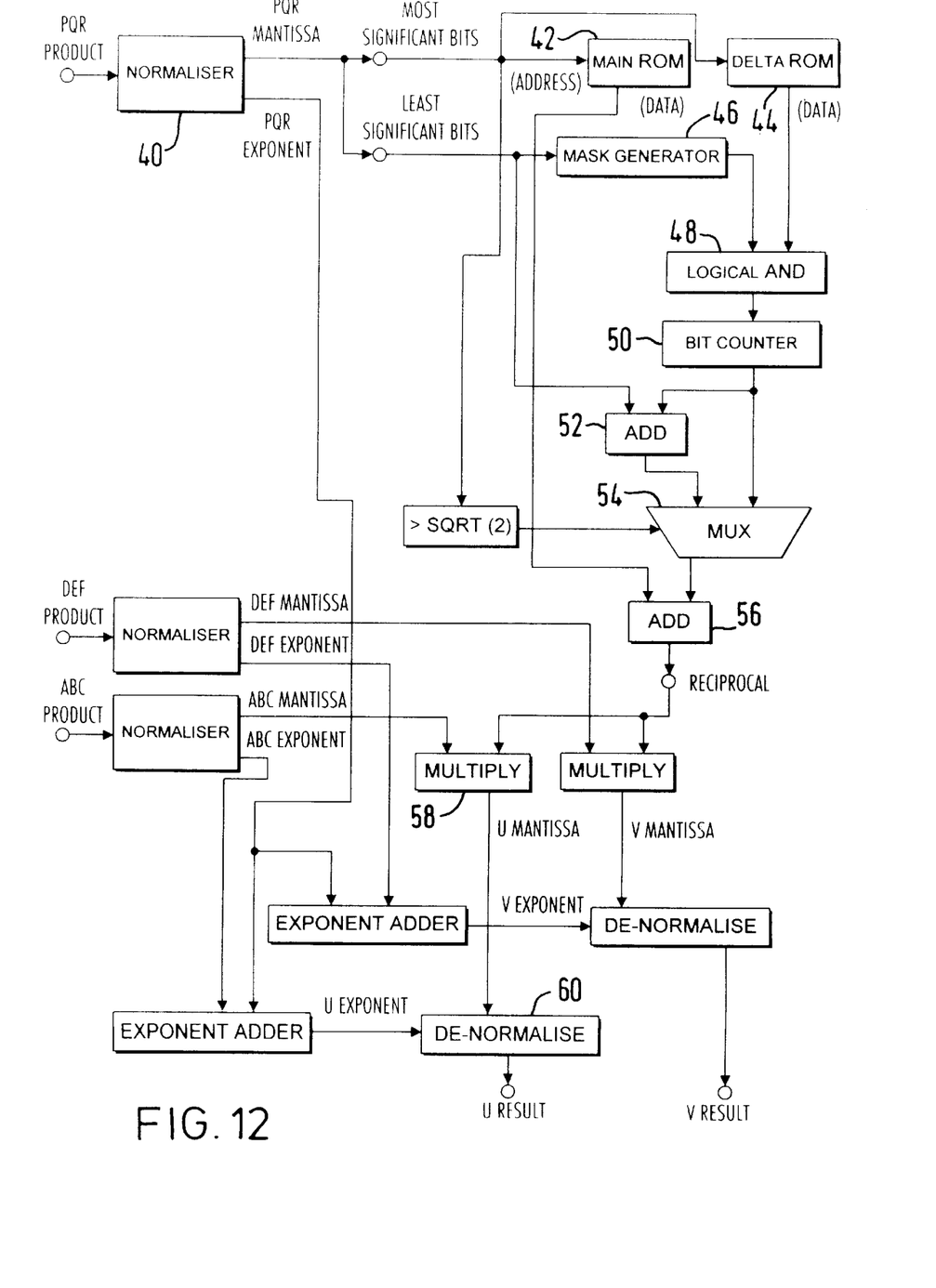
FIG. 12 is a block diagram of an improved circuit for performing arithmetic division.

The hardware implementation is depicted in FIG. 12.

The px+qy+r value (shown as "pqr product") is normalised 40 to a value between 1.0 and 2.0. The mantissa is considered in two parts as described above, a most-significant and least-significant part. The most-significant part is used as an address to access the ROM's 42, 44.

The least-significant part is used to generate a mask 46 which is logically ANDed 48 with the value from the Delta ROM 44. This is to isolate the first L bits from the Delta ROM, so they can be counted 50. The number of counted 1's (coming out of the unit calculated by adding 52 L to this. The correct offset is then selected by a comparator to compare the original number of √2 and selecting the appropriate result from equations (i) or (ii).

This offset value is then added 56 to the base value from the "Main ROM" to give the reciprocal of "pqr product".

The diagram then shows how the equation:

$$u = \frac{ax + by + c}{px + qy + r}$$

is completed by multiplying 58 the reciprocal given by ax+by+c ("abc product") and them denomalising 60

V is calculated in a similar way using dx+ey+f ("def product").

In order to avoid the computational expense of calculating 'D' a less precise, but more efficient method is:

$$D = \frac{n}{(px + qy + r)^2} \qquad \text{equ. 1}$$

'pz+qy+r' is the bottom half of the texture mapping equation.

'n' is a constant which is evaluated before rendering and stored with the other texturing parameters. There are a number of ways to calculate 'n', an example is given below:

$$n = r^2 \text{MAX} \frac{ar - pc^2}{pr + r^2} + \frac{dr - pf^2}{qr + r^2}, \frac{br - qc^2}{qr + r^2} + \frac{er - q^2 f}{qr + r^2} \quad \text{equ. 2}$$

'a', 'b', 'c', 'd', 'e', 'f', 'p', 'q', and 'r' are the texture mapping co-efficients.

Equation 2 evaluates 'D' using Heckbert's approximation at pixel coordinate (0.0), then makes equation 1 equal to that value. This is not ideal because the best approximation of 'D' should be where the textured surface is visible. Therefore a better method would be to make equation 1 equal to Heckberts approximation at a pixel coordinate of the visible surface.

Figure 10:
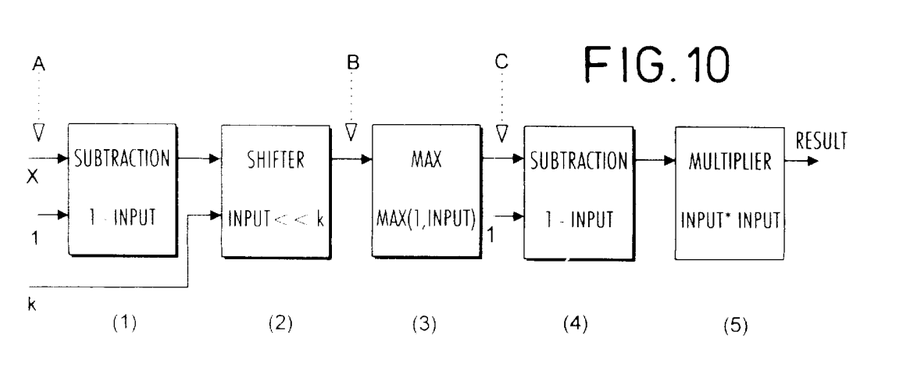
FIG. 10 is a block diagram for implementing the power foggings function.

This section describes a hardware implementation of the power function approximation which is shown in FIG. 10. It takes as input, a value X, which is in the range of $0 \leq x \leq 2$, expressed in a fixed point notation, and a small positive integer k, and outputs a fixed point result, again in the range $0 \leq x \leq$.

The number of bits X, (i.e. at the input to the function at point A in the diagram) would depend on the required concentration of the highlight, but would typically be around 16 bits. In this discussion this will be m.

The number of bits of k will typically be 3 or 4, and again depends on the concentration of the highlight required. This will be referred to as n.

The number of bits of result would depend on the accuracy required. It will be assumed that p bits of output accurately are needed.

Steps
1. The fixed point X is first subtracted from a fixed point constant value of 1. The number of bits of output remains the same as the input, i.e. m bits.
2. The value is then shifted left by k positions. The width at point B would be $m+(2\pi-1)$ bits, representing fixed point numbers in the range $0 \ldots 2\pi$.
3. The value is then clamped to 1, by the MAX. function. This entails examining the upper $2\pi$ bits, and if any are set, then the value must be greater than or equal to one. In this instance the output can be set to a fixed point 1.0. If none of the upper $2\pi$ bits are set, then the output value is the same as the input. Depending on the quality of the result required, the number of bits output from the MAX. function, i.e. at point C, is limited to either p or p+1 bits. The bits that are chosen are the upper p or p+1 bits of the lower m. That is, the value output is still a fixed point number in the range $0 \leq x \leq 1$, but with only p or p+1 of precision.
4. Depending on the quality of the result required, the number of bits output from the MAY. function, i.e. at point C, is limited to either p or p+1 bits. The bits that are chosen are the upper p or p+1 bits of the lower m. That is, the value output is still a fixed point number in the range $0 \leq x \leq 1$, but with only p or p+1 of precision.
5. The value is then subtracted form 1 in fixed point format. The number of bits of precision still remains either p or p+1.
6. The value is then squared, by multiplying by itself. Depending on the size of the operand, i.e. either p or p+1 bits, this gives a value with either $p^2$ or $(p+1)^2$ bits. In either case, the top p bits are taken and are output as the result, giving a fixed point value in the range $0 \leq \text{result} \leq 1$.

The shading hardware unit is not dissimilar to the texturing unit with respect to precalculations and iteration units, which are standard forward differencing techniques. The three shading modes, flat, linear, and quadratic are now discussed.

For the purposes of the following discussion, the shading functions will be described in terms of x and y pixel positions. Although these can be absolute screen pixel positions, it is far more effective to make these relative to the centre of the face being shaded. Doing so greatly reduces the precision required to represent the various $T_n$ parameters discussed below.

If flat shading, then no precalculation or interation need be performed, the constant value either being used directly, or being multiplied by the results of the texturing pipeline.

The linear shading require a precalculation of the form:

$$I(x,y) = T_2 x + T_1 y + T_0$$

The iteration part then only needs to repeatedly add $T_2$, since:

$$I(x+1, y) = T_2(x+1) + T_1 y + T_0$$
$$= I(x, y) + T_2$$

The quadratic shading is also performed using difference equations. Noting that the quadratic shading equation is given by:

$$I(x,y) = T_5 x^2 + T_4 xy + T_3 y^2 + T_2 x + T_1 y + T_0$$

then the difference between I between pixel (x,y) and pixel (x+1,y) is given by:

$$\Delta I(x, y) = I(x+1, y) - (x, y)$$
$$= T_2(x+1)^2 - T_5 x^2 + T_4(x+1)y - T_4 xy + T_2(x+1) - T_2 x$$
$$= T_2(2x+1) + T_4 y + T_2$$

and the difference between differences at pixel xy, is therefore:

$$\Delta\Delta(x, y) = \Delta I(x+1, y) - \Delta I(x, y)$$
$$= T_5(2(x+1)+1) + T_4 y + T_2 - T_5(2x+1) - T_4 y - T_2$$
$$= T_5(2x+3) - T_5(2x+1)$$
$$= 2T_5$$

The precalculation unit, thus needs to compute the initial starting I, and the initial delta value, i.e.

$$I(x,y) = T_5 x^2 + T_4 xy + T_3 y^y + T_2 x + T_1 y + T_0$$

$$\Delta I(X,Y) = T_5(2x+1) + T_4 y + T_2$$

To perform the iterations, the next I value is obtained by adding the delta value, and a new delta is generated by adding on the difference in deltas, i.e.

$$I(x+1,y) = I(x,y) + \Delta I(x,y)$$

and $$\Delta I(x+1, y) = \Delta I(x, y) + \Delta\Delta I(x, y)$$

-continued $$= \Delta I(x, y) + 2T_5$$

Only 2 additions need to be performed per pixel. It is assumed that the output values are fixed point and are clamped to the range 0 . . . 1. If calculating highlights, this value can be put into the power function, as described above.

Above it was explained that the fogging attenuation factor is calculated by the following equation.

$$A = d^n$$

Where 'A' is the attenuation factor, 'd' is the fog density, and 'n' is the distance between the rendered object and the viewer. This equation can be rewritten as:

$$A = 2^{n \cdot \log_2(d)}$$

This simplifies the operations to a multiply and a $2^{-x}$ function. Implementing this function as a lookup table would be prohibitively large for the accuracy required, so a method of compressing the information is proposed.

The function $2^{-x}$ is conveniently 'self similar' every power of two. $2^{-x}$ between 0 and 1 is the same as $2^{-x}*2$ between 1 and 2, and the same as $2^{-x}*4$ between 2 and 3. Therefore, the function can be implemented with a lookup table of the fractional power of 2 and an arithmetic shifter on the output. Below is an example input to the proposed function.

Bit 0 1 2 3 4 5 6 7 8 9 10 11 12 13 14 15 16 17 18 19 20 21 22 23 24 25 . . .

Bits 0 to 6 are the index into the power table.

Bits 7 to 9 are used to shift down the answer of the lookup. If any of the bits above bit 10 are set, then the result is 0.

The architecture described in the patent application "Shading Three-Dimensional Images" (Application No. 9414834.3) has the ability to supply a number proportional to the reciprocal of the distance between the rendered object and the viewer. The fogging function would have to be altered to $2^{\log_2(d)/n}$. Unfortunately, there is no easy way to evaluate this function. An acceptable approximation to this function is $A = 1 - 2^{n \cdot \log_2(d)}$.

What is claimed is:

1. A method for texturing a three dimensional image using two-dimensional texture image data for display on a screen comprising the steps of:
   determining which objects in the three-dimensional image are visible at a plurality of adjacent elementary areas (pixels) of the screen;
   after determining the objects visible at a plurality of adjacent screen pixels, receiving data comprising the location of a selected screen pixel, and associated image data for the selected screen pixel wherein, the received image data includes data based on the object visible at the selected screen pixel;
   retrieving texture image data from a memory means in dependence on the image data;
   mapping an appropriate portion of said texture image data onto the selected screen pixel in dependence on the associated image data;
   based on the objects visible at the plurality of adjacent screen pixels, determining the number of screen pixels which share the same associated image data;
   determining an incremental change in the mapping of the texture image data onto the screen pixels on a pixel-by-pixel increment; and
   for each new screen pixel sharing the same image data as an adjacent screen pixel, combining previously derived texture image data for the adjacent screen pixel with said incremental change in texture image data to derive texture image data for the new screen pixel and mapping the derived texture image data onto the new screen pixel.

2. The method for texturing a three-dimensional image according to claim 1, further including the step of:
   storing in a dynamic random address memory (DRAM) mip-map texels for the object visible at the screen pixel, each texel being image data for an elementary area of the visible object, the texels being offset from a base texel in a first U dimension and in a second V dimension, the DRAM having a plurality of addressable locations in which texels are individually stored and the individual locations are locatable based on an offset from a base DRAM address, wherein, in said step of storing the texels, the individual texels are stored in the addressable locations in the DRAM based on separate u and v offset address bits wherein the pixel stored in a DRAM addressable location offset from the DRAM base address is the texel offset from the base texel based on interleaved u and v address bits so that, the texel stored in the DRAM addressable location offset by a set of address bits from the base address in the DRAM is the texel offset from the base texel in the U and V dimensions at address $u_n v_n \ldots u_2 v_2 u_1 v_1 u_0 v_0$.

3. The method according to claim 2, wherein:
   consecutive levels of resolution of mip-map data are stored alternately in two DRAM banks, each DRAM bank having a plurality of pages that contain individually addressable memory elements in which the mip-map data are stored, a first DRAM bank has a sufficient number of pages for containing all the even levels of resolution of mip-map data for a given texture and a second DRAM bank has a sufficient number of pages for containing all the odd levels of resolution of mip-map data for that texture; and
   in said step of retrieving texture image data, texture image data is generated for retrieval based on an even resolution of mip-map data and a numerically adjacent odd resolution of mip-map data and the page in the first DRAM bank containing the even resolution of mip-map data and the page in the second DRAM bank containing the odd of mip-map data are held open simultaneously.

4. The method according to claim 3, wherein the DRAM banks simultaneously store mip-map data for a plurality of different textures and the even levels of resolution of mip-map data for a first texture in the memory page of the first DRAM bank are interleaved with odd levels of resolution of mip-map data for a second texture, and the odd levels of mip-map data for the first texture in the second DRAM bank are interleaved with even levels of mip-map data for the second texture.

5. The method for texturing a three-dimensional image according to claim 1, further including the step of:
   storing in a dynamic random address memory (DRAM) mip-map texels for the object visible at the screen pixel, each texel being image data for an elementary area of the visible object, the texels being offset from a base texel in a first U dimension and in a second V dimension, the DRAM having a plurality of addressable locations in which texels are individually stored and the individual locations are locatable based on an offset from a base DRAM address, wherein, in said step of storing the texels, the individual texels are stored in the addressable locations in the DRAM based on separate u and v offset address bits wherein the pixel stored in a DRAM addressable location offset from the DRAM base address is the texel offset from the base texel based on interleaved u and v address bits so that, the texel stored in the DRAM addressable location offset by a set of address bits from the base address in the DRAM is the texel offset from the base texel in the U and V dimensions at address $v_n u_n \ldots v_2 u_2 v_1 u_1 v_0 u_0$.

6. The method according to claim 5, wherein:

consecutive levels of resolution of mip-map data are stored alternately in two DRAM banks, each DRAM bank having a plurality of pages that contain individually addressable memory elements in which the mip-map data are stored, a first DRAM bank has a sufficient number of pages for containing all the even levels of resolution of mip-map data for a given texture and a second DRAM bank has a sufficient number of pages for containing all the odd levels of resolution of mip-map data for that texture; and in said step of retrieving texture image data, texture image data is generated for retrieval based on an even resolution of mip-map data and a numerically adjacent odd resolution of mip-map data and the page in the first DRAM bank containing the even resolution of mip-map data and the page in the second DRAM bank containing the odd of mip-map data are held open simultaneously.

7. The method according to claim 6, wherein the DRAM banks simultaneously store mip-map data for a plurality of different textures and the even levels of resolution of mip-map data for a first texture in the memory page of the first DRAM bank are interleaved with odd levels of resolution of mip-map data for a second texture, and the odd levels of mip-map data for the first texture in the second DRAM bank are interleaved with even levels of mip-map data for the second texture.

8. A method for texturing a three dimensional image using two-dimensional texture image data for display on a screen comprising the steps of:

receiving data comprising the location of a screen pixel, and associated image data for the pixel wherein, the received image data includes data based on the object visible at the pixel;

storing in a dynamic random address memory (DRAM) mip-map texels for the object visible at the screen pixel, each texel being image data for an elementary area of the visible object, the texels being offset from a base texel in a first U dimension and in a second V dimension, the DRAM having a plurality of addressable locations in which texels are individually stored and the individual locations are locatable based on an offset from a base DRAM address, wherein, in said step of storing the texels, the individual texels are stored in the addressable locations in the DRAM based on separate u and v offset address bits wherein the pixel stored in a DRAM addressable location offset from the DRAM base address is the texel offset from the base texel based on interleaved u and v address bits so that, the texel stored in the DRAM addressable location offset by a set of address bits from the base address in the DRAM is the texel offset from the base texel in the U and V dimensions at address $u_n v_n \ldots u_2 v_2 u_1 v_1 u_0 v_0$;

generating texture image data based on the texels stored in the DRAM as function of the image data; and mapping an appropriate portion of said texture image data onto the screen pixel in dependence on the associated received image data.

9. The method according to claim 8, wherein:

consecutive levels of resolution of mip-map data are stored alternately in two DRAM banks, each DRAM bank having a plurality of pages that contain individually addressable memory elements in which the mip-map data are stored, a first DRAM bank has a sufficient number of pages for containing all the even levels of resolution of mip-map data for a given texture and a second DRAM bank has a sufficient number of pages for containing all the odd levels of resolution of mip-map data for that texture; and in said step of generating texture image data, texture image data is generated for retrieval based on an even resolution of mip-map data and a numerically adjacent odd resolution of mip-map data and the page and the page in the first DRAM bank containing the even resolution of mip-map data and the page in the second DRAM bank containing the odd of mip-map data are held open simultaneously.

10. The method according to claim 9, wherein the DRAM banks simultaneously store mip-map data for a plurality of different textures and the even levels of resolution of mip-map data for a first texture in the memory page of the first DRAM bank are interleaved with odd levels of resolution of mip-map data for a second texture, and the odd levels of mip-map data for the first texture in the second DRAM bank are interleaved with even levels of mip-map data for the second texture.

11. The method according to claim 10, wherein the DRAM banks simultaneously store mip-map data for a plurality of different textures and the even levels of resolution of mip-map data for a first texture in the memory page of the first DRAM bank are interleaved with odd levels of resolution of mip-map data for a second texture, and the odd levels of mip-map data for the first texture in the second DRAM bank are interleaved with even levels of mip-map data for the second texture.

12. A method for texturing a three dimensional image using two-dimensional texture image data for display on a screen comprising the steps of:

receiving data comprising the location of a screen pixel, and associated image data for the pixel wherein, the received image data includes data based on the object visible at the pixel;

storing in a dynamic random address memory (DRAM) mip-map texels for the object visible at the screen pixel, each texel being image data for an elementary area of the visible object, the texels being offset from a base texel in a first U dimension and in a second V dimension, the DRAM having a plurality of addressable locations in which texels are individually stored and the individual locations are locatable based on an offset from a base DRAM address, wherein, in said step of storing the texels, the individual texels are stored in the addressable locations in the DRAM based on separate u and v offset address bits wherein the pixel stored in a DRAM addressable location offset from the DRAM base address is the texel offset from the base texel based on interleaved u and v address bits so that, the texel stored in the DRAM addressable location offset by a set of address bits from the base address in the DRAM is the texel offset from the base texel in the U and V dimensions at address $vu_n \ldots v_2 u_2 v_1 u_1 v_0 u_0$;

generating texture image data based on the texels stored in the DRAM as function of the image data; and mapping an appropriate portion of said texture image data onto the screen pixel in dependence on the associated received image data.

13. The method according to claim 12, wherein:

consecutive levels of resolution of mip-map data are stored alternately in two DRAM banks, each DRAM bank having a plurality of pages that contain individually addressable memory elements in which the mip-map data are stored, a first DRAM bank has a sufficient number of pages for containing all the even levels of resolution of mip-map data for a given texture and a second DRAM bank has a sufficient number of pages for containing all the odd levels of resolution of mip-map data for that texture; and in said step of generating texture image data, texture image data is generated for retrieval based on an even resolution of mip-map data and a numerically adjacent odd resolution of mip-map data and the page and the page in the first DRAM bank containing the even resolution of mip-map data and the page in the second DRAM bank containing the odd of mip-map data are held open simultaneously.

\* \* \* \* \*